1,740,838

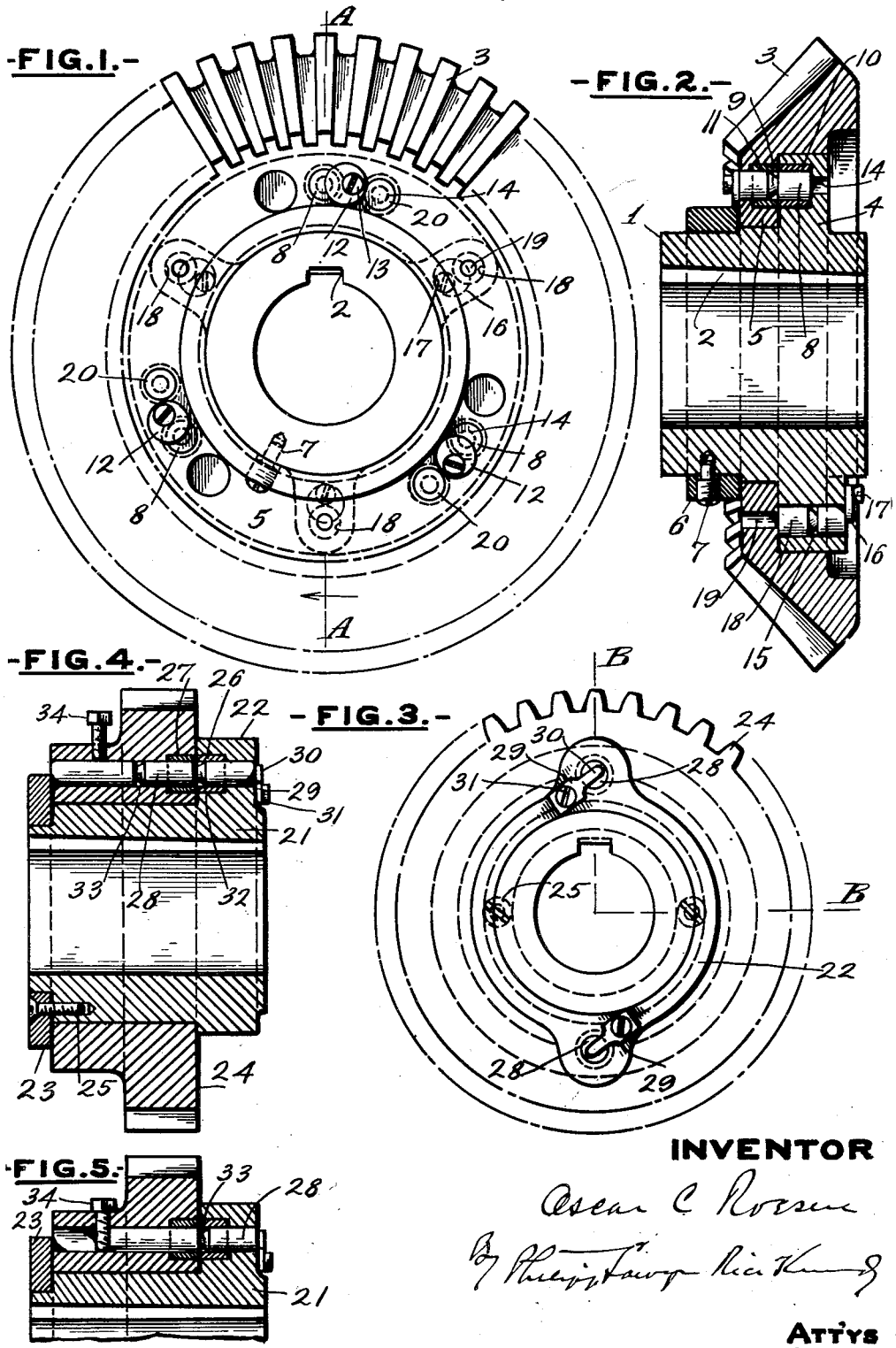
Dec. 24, 1929.   O. C. ROESEN   1,740,838
SHEAR PIN MOUNTING
Filed Nov. 7, 1925
INVENTOR
Oscar C. Roesen
ATT'YS Patented Dec. 24, 1929

UNITED STATES PATENT OFFICE

OSCAR C. ROESEN, OF BROOKLYN, NEW YORK, ASSIGNOR TO R. HOE AND CO., INC., OF NEW YORK, N. Y., A CORPORATION OF NEW YORK

SHEAR-PIN MOUNTING

Application filed November 7, 1925. Serial No. 67,535.

This invention relates to certain improvements in shear pin devices for securing driven and driving members together.

In certain driving constructions, it is a common practice to secure the gears or other driven members to their supports by means of shear pins, that is, a pin is provided which will break, thus permitting the gear to run free on its support in case of too great an overload being placed on the gear and thus causing injury to the gears or the gear operating mechanism. This is particularly true of the gears which drive folding rolls of rotary folders, a jam of products at the folder throwing an undue strain on the gears. In the present practice, when one of these pins breaks, the machine is stopped and the operator has to drive the parts of the broken pin out of the pin seats and replace the broken pin with a new pin. It frequently happens that the broken pins jam in their seats so that considerable time and trouble is necessary to get the pins out. Furthermore, as these pins are small, they are easily mislaid and frequently time must be spent in looking for a new pin. Both these occurrences lead to an undue stoppage of the machine and consequently loss of time, which is a great disadvantage in operating certain classes of machines, as, for instance, printing machines, where the time element is of the utmost importance.

It is the particular object of the present invention to provide a construction including driven and driving members in which provision is made for carrying one or more replaceable shear pins by one of the members, with the construction so arranged that a new pin may be put in place without removing the broken pin at all or removing only part of the broken pin, so that the operator always has a convenient supply of extra pins.

A further object of the invention is to provide a simple construction for effecting this, and one in which the new pin may be placed in position in an expeditious manner and with very little expenditure of time and effort on the part of the operator.

With these and other objects not specifically referred to in view, the invention consists in certain novel parts, arrangements and combinations which will be described in connection with the accompanying drawings and the novel features pointed out in the claim hereunto annexed.

In these drawings,—

Figure 1 is a face view of a miter gear showing one embodiment of the invention;

Figure 2 is a central vertical sectional view taken on the line A—A of Fig. 1 looking in the direction of the arrow;

Figure 3 is a face view of a modification of the invention, the modified form being shown as used with a spur gear or pinion;

Figure 4 is a section on the irregular line B—B of Fig. 3 showing the modified construction, and Figure 5 is a partly sectional view similar to Fig. 4 showing the parts with an unbroken shear pin in position In the drawings which represent one embodiment of the invention, the construction selected to illustrate the invention includes a gear, but it will be understood the invention is capable of use in other relations. Referring first to Figs. 1 and 2, there is provided a journal or hub 1 provided with a key-way 2 by which it may be keyed to a shaft, not shown. Carried on this hub is a gear shown in the form of a miter 3. This gear is mounted on the hub, so that it has no endwise movement thereon, in any suitable manner. As shown, the hub is provided with a flange 4 and the gear is provided with a projecting flange 5 which bears against the flange 4 and is locked in position by a locking collar 6 held in position by a screw 7 tapped into the hub.

This gear is secured to the hub by shear pins 8, three of these pins being employed in the particular constructions shown. These pins are of usual form, having a cut away or weakened portion 9 which will break if undue strain is put on the parts, thus permitting the gear to run free on the hub.

These pins are seated in the parts in any suitable manner. In the particular construction shown the flange 4 of the hub and the flange 5 of the gear are recessed to receive bushings 10, 11 in which the pin seats. The pin is held against sidewise displacement by means of a plate 12 secured on a screw 13 so that it can be turned into and out of engagement with the end of the pin. The pin seats at its other end against the bottom of the recess so that it is held against longitudinal movement in either direction. The bottom of the recess is provided with a smaller recess 14 which extends through the flange 4 in which a suitable tool may be inserted to drive out a broken pin.

In accordance with the invention, means are provided whereby a replaceable or extra pin or pins may be carried in either the hub or the gear so as to afford a convenient supply for the operator. While the construction for doing this may be varied, referring first to Fig. 2, there are three extra pins provided corresponding to the three pins in use, and these extra pins are carried in recesses 15 in the hub, being held in position by plates 16 pivoted on screws 17, these extra pins being marked 18. To enable the pins to be removed from the hub for use, the gear is provided with an opening 19 into which a tool may be inserted for removing the pins 18 from their recesses.

In order that a replaceable pin may be inserted in position without removing a broken pin, the hub and the gear are provided with second pairs of bushed recesses 20, these being located closely adjacent the recesses carrying the pins in use—8. Preferably, therefore, the plate 12 is eccentrically pivoted between these recesses so that it can be moved to uncover one and cover the other. In use, when the shear pins break, the pins 18 are removed from their seats and inserted in the extra recesses and the broken pins left in their seats, so that a very short stoppage of the machine is necessary, the old pins being removed at some later time convenient to the operator. With this construction, therefore, a considerable saving of time is effected.

If desired, a certain modified construction may be provided, such as is shown in Figs. 3 to 5. As illustrated, there is provided a hub 21 having a flange 22. Secured on this hub, between the flange and a locking ring 23, is a pinion or spur gear 24, the locking ring being held in place by a screw 25 tapped into the hub. This pinion gear is held in position on the hub by a shear pin, which in the modification shown in these figures is provided with a renewable part; in other words, when the shear pin breaks the rest of the pin forms a second shear pin. In the particular construction shown, therefore, the hub and the gear are provided with shallow recesses having bushings 26, 27, in which seats a shear pin 28. This shear pin is held against endwise movement by a plate 29 having an end 30 which engages the end of the pin, this plate being pivoted on a screw 31.

This pin is provided with two weakened portions 32, 33, and the pin extends through the gear, being held against movement in the opposite direction by bearing against the locking ring 23, before referred to. This locking ring, however, does not cover the whole end of the pin, as shown in Fig. 4, a part of the end of the pin being left, which may be engaged by a suitable tool for driving it into position. If the pin breaks at the point 32, the pin may be driven from the position shown in Fig. 4 to the position shown in Fig. 5, in which position the weakened part 33 is in breaking position. When it has been thus moved it may be held against endwise movement by a set screw 34.

With the construction described it will be seen that a new supply of pins is always at hand convenient to the operator which may be inserted very quickly so that a stoppage of the machine for any substantial time is avoided. While the invention has been shown and described in its preferred forms, it will be understood that various other arrangements are possible for effecting the objects of the invention within the scope of the appended claim.

What I claim is:

The combination of a hub or journal and means for securing it to a shaft, a gear on the hub, a shear pin connecting the hub and gear, a seat for the pin, a second seat formed in both of the members closely adjacent the first named seat capacitated to receive a second shear pin whereby the gear and hub may be connected without removing the first pin from its seat, and a holding plate common to both seats for holding a shear pin in either.

In testimony whereof, I have hereunto set my hand.

OSCAR C. ROESEN.